Patented Jan. 4, 1949

2,458,420

UNITED STATES PATENT OFFICE 2,458,420

ACRYLIC ESTER-AMIDES AND POLYMERS THEREOF

Delbert D. Reynolds and William O. Kenyon, Rochester, N. Y., assignors to Eastman Kodak Company, Rochester, N. Y., a corporation of New Jersey No Drawing. Application November 22, 1947, Serial No. 787,606

8 Claims. (Cl. 260—83)

This invention relates to a new group of unsaturated ester-amides, polymers thereof, and to processes for their preparation.

The new ester-amides of the invention may be represented by the structural formula:

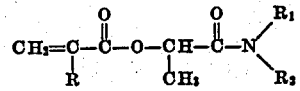

in which R represents hydrogen, a halogen atom (e. g. chlorine or bromine), a saturated alkyl group (e. g. methyl, ethyl, propyl, isopropyl, butyl, isobutyl, sec. butyl, tert. butyl, etc.), an aryl group (e. g. phenyl, naphthyl, tolyl, xylyl, etc.), an aralkyl group (e. g. benzyl, phenylethyl, etc.), an alkoxy or aryloxy group (e. g. methoxy, ethoxy, propoxy, isopropoxy, butoxy, phenoxy, etc.), a cycloalkyl group (e. g. cyclopropyl, cyclobutyl, cyclohexyl, etc.), an acyl group (e. g. acetyl, propionyl, butyryl, etc.), an acyloxy group (e. g. acetoxy, propionyloxy, butyryloxy, etc.), a heterocyclic group (e. g. piperidyl), a carboxyl group, a carbalkoxy group (e. g. carbmethoxy, carbethoxy, etc.), a cyano group, an amino group (e. g. dimethylamino, diphenylamino, methylphenylamino, etc.), a diacylamido group (e. g. phthalimido, etc.), and similar groups, and $R_1$ and $R_2$ can be the same or different groups or atoms selected from the group consisting of hydrogen, a saturated alkyl group or an aryl group as above defined. The new ester-amides are non-resinous compounds having distinct boiling points and melting points and are capable of isolation in substantially pure state. At normal temperatures, they are crystalline and soluble in most of the common organic solvents such as benzene, acetone, methyl acetate, chloroform, etc., but insoluble in low boiling aliphatic hydrocarbons such as petroleum ether. The new ester-amides are valuable intermediates in the preparation of other chemical compounds. They are also excellent modifying agents in compositions containing resinous materials such as cellulose esters, polyvinyl acetate, polystyrenes, polymethyl methacrylates, etc. In addition, they are polymerizable alone or conjointly with other unsaturated compounds to valuable resinous products.

It is, accordingly, an object of the invention to provide a new class of unsaturated ester-amides of the acrylic acid series, and polymers thereof. Another object is to provide a method for preparing the same. Other objects will become apparent hereinafter.

In accordance with the invention, the new ester-amides are prepared by esterifying the hydroxyl group of lactamide or its N-alkyl or N-aryl or substituted N-alkyl or N-aryl derivatives with acrylic anhydride or α-substituted acrylic anhydrides or acrylyl chlorides having the general formula:

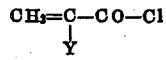

wherein Y represents hydrogen, a halogen atom, a cyano group, a saturated alkyl group, an aryl group, an aralkyl group, an alkoxy or aryloxy group, a cycloalkyl group, an acyl group, an acyloxy group, a heterocyclic group, a carboxyl group, a carbalkoxy group, an amino group or a diacylamido group, as previously defined. Where the acid chlorides are employed as the esterifying agent, the reaction is carried out advantageously at a temperature not exceeding 40° C., in an inert solvent medium such as anhydrous benzene, methyl acetate, chloroform, dioxane, etc., and in the presence of an acid-binding agent, for example, anhydrous sodium carbonate, and a dehydrating agent, for example, anhydrous calcium sulfate. This process is described and claimed in copending application Serial No. 787,605, filed of even date herewith, in the names of Delbert D. Reynolds and William O. Kenyon. The α-substituted acrylic acid chlorides, above defined, may be prepared by treating the corresponding free acids or their esters with thionyl chloride or phosphorus chlorides. The new ester-amides may be isolated from their preparation mixtures and purified in any convenient manner, for example, as described in the examples which follow.

Suitable amides of lactic acid for use in the preparation of the new ester-amides include lactamide, N-methyl lactamide, N-dimethyl lactamide, N-ethyl lactamide, N-diethyl lactamide, N-propyl lactamide, N-dipropyl lactamide, N-isopropyl lactamide, N-diisopropyl lactamide, N-butyl lactamide, N-dibutyl lactamide, N-isobutyl lactamide, N-diisobutyl lactamide, N-secondary butyl lactamide, N-disecondary butyl lactamide, N-tertiary butyl lactamide, N-ditertiary butyl lactamide, lactanilide, N-diphenyl lactamide, N-methyl N-phenyl lactamide, N-ethyl N-phenyl lactamide, N-p-tolyl lactamide, N-p-ditolyl lactamide, N-o-tolyl lactamide, etc. These lactamides can be prepared by the amidation of the alkyl esters of lactic acid such as, for example, methyl lactate or ethyl lactate amidated with ammonia or with a primary or secondary organic amine such as methylamine, dimethylamine, ethylamine, diethylamine, propylamine, dipropylamine, butyl-amine, dibutylamine, etc. Ordinarily, the lactate is dissolved in benzene containing the amine to be reacted with the lactate and also containing a small amount of sodium ethylate. After completion of the reaction, the excess benzene is removed by distillation, the residue extracted with chloroform, and the extract washed with dilute aqueous acid and then with water. The lactamide is then obtained from the chloroform extract by fractional distillation of the extract.

The polymerization of the new-ester amides alone or conjointly with other polymerizable compounds is accelerated by heat, and by the polymerization catalysts which are known to accelerate the polymerization of acrylic compounds. Exemplary of such catalysts are the organic peroxides (e. g. benzoyl peroxide, acetyl peroxide and lauroyl peroxide), hydrogen peroxide, perborates (e. g. alkali metal perborates), persulfates (e. g. alkali metal persulfates) and reduction-oxidation reagents (e. g. sodium bisulfite with ammonium persulfate, hydrogen peroxide with ferrous sulfate, etc.). The polymerization can be effected in mass or in the presence of a diluent. The diluent, if employed, is advantageously though not necessarily, a solvent for the polymer. The monomers can also be emulsified in a liquid in which they are insoluble (e. g. water) and the emulsion subjected to polymerization. The monomers can also be suspended in water using relatively poor dispersing agents such as starch and polymerized in the form of granules. The monomers can also be copolymerized with one or more other ethylenic monomers having the general structural formula:

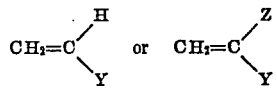

wherein Y and/or Z are alkyl, aryl, aralkyl, alkoxyl, aryloxy, aralkoxyl, halogeno, acylamido, sulfonamido, sulfamyl, acyloxyl, carbalkoxyl, carbamido, nitrile, aldehydo, heterocyclic, dialkylamino, acylimino, etc. Specific compounds coming within the above formulas include among others propylene furylethylene, isobutylene, vinyl formate, vinyl acetate, vinyl propionate, vinyl butyrate, vinyl stearate, vinyl thioacetate, vinyl benzoate, vinyl oxalate, isopropenyl acetate, methylene dimethyl malonate, divinyl formal, acrolein, α-methacrolein, vinyl chloride, vinyl bromide, isopropenyl chloride, vinylidene chloride, vinyl chloroacetate, vinyl trichloroacetate, vinyl isocyanate, isopropenyl isocyanate, vinyl acetylene, vinyl urethane, vinyl methyl ketone, vinyl phenyl ketone, vinyl benzyl ketone, vinyl cyclohexyl ketone, vinyl furyl ketone, vinyl p-tolyl ketone, isopropenyl methyl ketone, vinyl methyl ether, vinyl propyl ether, vinyl butyl ether, divinyl ether, vinyl phenyl ether, isopropenyl methyl ether, vinyl sulfonamide, vinyl sulphonic acid, vinyl p-tolyl sulphoxide, vinyl β-naphthyl sulphone, vinyl p-tolyl sulphone, isopropenyl methyl sulphone, butadiene, isoprene, chloroprene, 2-acetoxy butadiene-1,3, N-vinyl acetamide, N-vinyl methylacetamide, N-vinyl phenylacetamide, N-vinyl ethylacetamide, N-vinyl methyl formamide, N-vinyl acetanilide, N-vinyl N-p-tolyl acetamide, N-vinyl N-cyclohexyl acetamide, N-vinyl N-methyl butyramide, N-vinyl pyrrole, N-vinyl pyrrolidine, N-vinyl carbazole, vinyl pyridine, vinyl quinoline, styrene, α-methyl styrene, α-chlorostyrene, vinyl phenol, vinyl naphthalene, divinyl benzene, isopropenyl benzene, N-vinyl succin- imide, N-vinyl tetrahydrophthalamide, N-vinyl phthalimide, N-vinyl glutarimide, N-vinyl diglycolylimide, N-isopropenyl phthalimide, acrylonitrile, methacrylonitrile, α-methoxyacrylonitrile, α-acetoxyacrylonitrile, α-chloro-acrylonitrile, α-phthalimido acrylonitrile, α-phenoxyacrylonitrile, acrylic acid, methacrylic acid, α-chloroacrylic acid, methyl acrylate, methyl methacrylate, methyl ethacrylate, benzyl acrylate, allyl methacrylate, β-ethoxyethyl acrylate, N-diacetyl acrylamide, N-ethyl acrylamide, N-diethyl acrylamide, etc. Still other unsaturated organic compounds which can be copolymerized with the new ester-amides of the invention to give valuable resinous products include the amides, nitriles and esters of maleic acid, fumaric acid, maleamic acid, fumaramic acid, citraconic acid and itaconic acid. Examples of the latter compounds include maleamide, fumaramide, itaconamide, fumaronitrile, maleonitrile, itacononitrile, citracononitrile, methyl maleate, methyl fumarate, dimethyl maleate, dimethyl fumarate, diisopropyl maleate, diisopropyl fumarate, and similar compounds.

The preferred copolymers of the invention are obtained by employing starting polymerization mixtures containing from 5 to 95 parts by weight of the new monomeric ester-amide and from 95 to 5 parts by weight of one or more of the other above-mentioned unsaturated monomeric organic compounds.

The following examples will serve to illustrate our new ester-amides, polymers thereof, and the processes for preparing the same.

*Example 1.—N-phenyl lactamide*

A mixture of 2 parts of ethyl lactate and 1 part of aniline was added to an excess of benzene which contained a small amount of sodium ethylate. The mixture was distilled azeotropically to remove the ethanol as formed in the reaction. After the completion of the reaction, the excess benzene was removed by distillation, and chloroform added to the residue. The resulting chloroform layer, after thorough shaking with the residue, was washed with dilute hydrochloric acid and then with water. The chloroform was removed by distillation and the crude N-phenyl lactamide thus obtained was isolated in pure condition by fractionation of the residue. The N-phenyl lactamide had a boiling point of 164° C. at 2 mm. pressure, and was crystalline at room temperature. In similar manner as described in the above example, N-alkyl substituted lactamides were made from ethyl lactate and alkylamines, for example, N-ethyl lactamide was made from ethyl lactate and ethylamine, N-dibutyl lactamide from ethyl lactate and dibutylamine, and N-dimethyl lactamide from ethyl lactate and dimethylamine, etc.

*Example 2.—N-phenyl α-acryloxy propionamide*

A mixture of 700 c. c. of anhydrous chloroform, 100 gms. of anhydrous sodium carbonate, 200 gms. of anhydrous calcium sulfate and 85 gms. of N-phenyl lactamide was stirred together for one hour, after which time 10 c. c. of anhydrous pyridine was added, followed by 50 gms. of acrylyl chloride. The temperature of the reaction mixture increased rapidly to 35° C. The mixture was then cooled to 20° C. and maintained at this temperature for a period of 24 hours, when it was filtered, the filtrate evaporated and the product obtained as crystals of N-phenyl α-acryloxy propionamide, which after recrystallization from ethanol and washing with water, had a melting point of 110° C.

Example 3.—α-Methacryloxy propionamide 225 gms. of lactamide were stirred with benzene and the water-benzene azeotrope was distilled off. The anhydrous solution which remained was cooled and to it were added 375 gms. of anhydrous calcium sulfate and 375 gms. of anhydrous sodium carbonate. The mixture was stirred and 200 gms. of methacrylyl chloride added at a rate sufficient to keep the temperature about 40° C., during the addition. Stirring was continued for another 18 hours, when the reaction mixture was filtered and the filtrate then concentrated to a thick syrup. Upon the addition of a low boiling hydrocarbon to the syrup, a crystalline product was obtained, which after recrystallization from a mixture of ether and a low boiling hydrocarbon had a melting point of 60–61° C. The yield was 47 gms. Analysis for nitrogen showed that a substantially pure α-methacryloxy propionamide had been obtained.

Example 4.—N-ethyl α-methacryloxy propionamide 117 gms. of N-ethyl lactamide, 500 c. c. of anhydrous methyl acetate, 150 gms. of anhydrous calcium sulfate and 150 gms. of anhydrous sodium carbonate were stirred together for a period of one hour, in a one-liter three-necked flask equipped with a mechanical stirrer, a dropping funnel and a thermometer. While continuing to stir, there were added 104 gms. of methacrylyl chloride at a rate sufficient to keep the temperature at less than 40° C. The reaction mixture was stirred for seven more hours and allowed to stand for another 15 hours, after which time the mixture was filtered and the filtrate concentrated to a syrup. Petroleum ether was mixed with the syrup and then removed by vacuum distillation. The residue was placed in a refrigerator, and in a short time had formed crystals of N-ethyl α-methacryloxy propionamide, which had after two recrystallizations from ether, a melting point of 50–51° C. Analysis for nitrogen indicated that pure N-ethyl α-methacryloxy propionamide had been obtained.

Example 5.—N-dibutyl α-methacryloxy propionamide 402 gms. of N-dibutyl lactamide, 300 gms. of anhydrous calcium sulfate, 300 gms. of anhydrous sodium carbonate and 5 gms. of cupric carbonate were stirred together in 1500 c. c. of anhydrous benzene, and 209 gms. of methacrylyl chloride were slowly added. After completion of the reaction, the mixture was poured with stirring into 6 liters of cold water. The benzene layer was separated and dried over calcium chloride. The benzene was then removed by vacuum distillation. One half of the residue was mixed with some cupric carbonate and transferred to a high-vacuum still (dibutyl phthalate-type vacuum still). The material polymerized on heating in the still and yielded only decomposition products at higher temperatures. The remaining half of the residue from the benzene layer was mixed with 5 gms. of didodecyl hydroquinone and some cupric carbonate. The mixture was placed in the dibutyl phthalate-type still and N-dibutyl α-methacryloxy propionamide was fractionated without polymerizing. The product had a boiling point of about 70° C. at a pressure of 100 microns.

Example 6.—Poly-N-phenyl α-acryloxy propionamide

A mixture of 10 gms. of N-phenyl α-acryloxy propionamide, 50 c. c. of anhydrous dioxane and 100 mgms. of benzoyl peroxide was heated on a steam bath for a period of three hours. It was then cooled and poured into an excess of water. There was obtained a white, fibrous poly-N-phenyl α-acryloxy propionamide. The product was leached in water and dried. It was soluble in acetone.

Example 7.—Poly α-methacryloxy propionamide

A mixture of 10 gms. of α-methacryloxy propionamide, 50 c. c. of dioxane and 10 mgms. of benzoyl peroxide was heated on a steam bath for a period of three hours. The mixture was cooled and poured into an excess of water, and the white, fibrous precipitate of poly α-methacryloxy propionamide so obtained was leached with water and dried. The resinous product dissolved in acetone and gave a clear, brittle residue on evaporation of the acetone.

Example 8.—Poly-N-dibutyl α-methacryloxy propionamide

A mixture of 5 gms. of N-dibutyl α-methacryloxy propionamide, 50 c. c. of dioxane and 50 mgms. of benzoyl peroxide was heated on a steam bath for several hours. The dope thus obtained was precipitated in water. The precipitate of poly-N,N-dibutyl α-methacryloxy propionamide was soluble in acetone and gave a clear, medium hard and tough residue on evaporation of the acetone.

Example 9.—Poly-N-ethyl α-methacryloxy propionamide 20 gms. of N-ethyl α-methacryloxy propionamide and 100 mgms. of benzoyl peroxide were heated in a sealed tube at 60° C. There was obtained a clear polymer of N-ethyl α-methacryloxy propionamide which was soluble in acetone.

Example 10.—Copolymer of α-methacryloxy propionamide and methyl methacrylate 4 grams of α-methacryloxy propionamide, 4 grams of methyl methacrylate and 80 mgms. of benzoyl peroxide were sealed in a clear glass ampoule. After heating in a 50° C. water bath for a period of about 24 hours, the mixture in the ampoule had changed to a clear, hard copolymeric resin.

By the above-described method of polymerization, there were also prepared resinous copolymers of 10 gms. N-ethyl α-methacryloxy propionamide with 6 gms. of 1-acetoxybutadiene, and 8 gms. of α-methacryloxy propionamide with 6.5 gms. of isobutylene.

Example 11.—Copolymer of N-phenyl α-acryloxy propionamide and styrene

A mixture of 4 gms. of α-acryloxy propionamide, 10 gms. of styrene, 10 c. c. of anhydrous dioxane and 150 mgms. of benzoyl peroxide was heated at 50° C. in a sealed tube. A soft, rubbery, clear, amber-colored polymer was obtained.

Example 12.—Copolymer of N-phenyl α-acryloxy propionamide and vinyl acetate

A mixture of 4 grams of N-phenyl α-acryloxy propionamide, 10 grams of vinyl acetate, 150 mgms. of benzoyl peroxide and 10 c. c. of anhydrous dioxane was heated at 50° C. in a sealed tube. There was obtained a soft and rubbery polymer.

*Example 13.—Copolymer of N-phenyl α-acryloxy propionamide and methyl acrylate*

A mixture of 4 grams of N-phenyl α-acryloxy propionamide, 10 grams of methyl acrylate, 10 c. c. of anhydrous dioxane and 150 mgms. of benzoyl peroxide was heated in a sealed tube at 50° C. A clear, rubbery, amber-colored polymer was obtained.

*Example 14.—Copolymer of N-ethyl α-methacryloxy propionamide and methyl methacrylate*

5 gms. of N-ethyl α-methacryloxy propionamide, 5 gms. of methyl methacrylate and 100 mgms. of benzoyl peroxide were dissolved in 10 c. c. of anhydrous dioxane and heated for several hours in a sealed tube at 50° C. A clear, hard polymer was obtained. In similar manner, but using 0.5 gm., 1 gm., 2 gms., 6 gms., 8 gms., and 9.5 gms. of N-ethyl α-methacryloxy propionamide to 9.5 gms., 9 gms., 8 gms., 4 gms., 2 gms., and 0.5 gm., respectively, of methyl methacrylate, there were obtained equally satisfactory clear and hard copolymers.

The polymers and copolymers of our invention show a diversity of physical and chemical properties which make them useful for a variety of purposes. For example, some members of the group of new-ester amides are soluble in organic solvents and some are soluble in organic solvents to which water has been added. In general, the polymers which show low susceptibility to water are best adapted for the preparation of plastics, films, lacquers, etc., while those which show both low susceptibility to water and high melting points are most useful for the preparation of textile fibers.

The polymers of the invention which show a high susceptibility to water are particularly useful as protective colloids and as substitutes for gelatin in photographic emulsions. In this case, the polymer coating is permeable to the processing solutions, but does not become softened by this treatment or subsequent washing to the extent of visibly disturbing the polymeric coating. Another advantage is that compositions containing this species of our new ester-amides can use water as the principal solvent with a small amount of an organic solvent such as alcohol, acetone, etc., added to it. Such compositions can be coated at high speeds, because the organic solvent flashes off almost immediately upon coating, and leaves the polymer on the coating surface in the form of a set layer or gel which dries rapidly.

We claim:
1. A compound having the general structural formula:

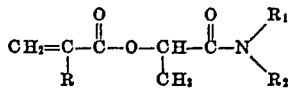

where R represents a member selected from the group consisting of an atom of hydrogen, a halogen atom, a cyano group, an alkyl group, an aryl group, an aralkyl group, an alkoxy group, an aryloxy group, a cycloalkyl group, a carboxylic acid acyl group, a carboxylic acid acyloxy group, a piperidyl group, a carboxyl group, a carbalkoxy group, and an amino group, and $R_1$ and $R_2$ each represents a member selected from the group consisting of an atom of hydrogen, an alkyl group and an aryl group.

2. N-phenyl α-acryloxy propionamide.
3. α-Methacryloxy propionamide.
4. N-ethyl α-methacryloxy propionamide.
5. A polymer of a compound having the general structural formula:

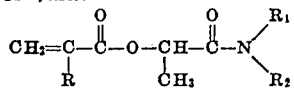

wherein R represents a member selected from the group consisting of an atom of hydrogen, a halogen atom, a cyano group, an alkyl group, an aryl group, an aralkyl group, an alkoxy group, an aryloxy group, a cycloalkyl group, a carboxylic acid acyl group, a carboxylic acid acyloxy group, a piperidyl group, a carboxyl group, a carbalkoxy group, and an amino group, and $R_1$ and $R_2$ each represents a member selected from the group consisting of an atom of hydrogen, an alkyl group and an aryl group.

6. A copolymer of from 5 to 95 parts by weight of N-phenyl α-acryloxy propionamide and from 95 to 5 parts by weight of vinyl acetate.

7. A copolymer of from 5 to 95 parts by weight of α-methacryloxy propionamide and from 95 to 5 parts by weight of methyl methacrylate.

8. A copolymer of from 5 to 95 parts by weight of N-ethyl α-methacryloxy propionamide and from 95 to 5 parts by weight of methyl methacrylate.

DELBERT D. REYNOLDS.
WILLIAM O. KENYON.

REFERENCES CITED

The following references are of record in the file of this patent:

UNITED STATES PATENTS

| Number | Name | Date |
|---|---|---|
| 2,141,546 | Strain | Dec. 27, 1938 |
| 2,311,548 | Jacobson et al. | Feb. 16, 1943 |